United States Patent [19]
Kivaev et al.

[11] 4,171,878
[45] Oct. 23, 1979

[54] COMBINED CONTACT LENS

[76] Inventors: Anatoly A. Kivaev, ulitsa Konstantinova, 24, korpus 2, kv. 37; Vladimir A. Barkov, ulitsa Polyarnaya, 26, korpus 2, kv. 189, both of Moscow; Robert I. Ezrielev, ulitsa Ziny Portnovoi, 17, korpus 3, kv. 101; Irina A. Arbuzova, ulitsa Torzhkovskaya, 14, kv. 11, both of Leningrad, all of U.S.S.R.

[21] Appl. No.: 639,366

[22] Filed: Dec. 10, 1975

[30] Foreign Application Priority Data

Dec. 17, 1974 [SU] U.S.S.R. .............................. 2082801

[51] Int. Cl.² ................................................. G02C 7/04
[52] U.S. Cl. ..................................... 351/160 R; 264/1; 351/160 H
[58] Field of Search ................................. 351/160-162

[56] References Cited

U.S. PATENT DOCUMENTS

| | | | |
|---|---|---|---|
| 3,488,111 | 1/1970 | Isen | 351/160 |
| 3,619,044 | 11/1971 | Kamath | 351/160 |
| 3,728,317 | 4/1973 | Blank | 351/160 X |
| 3,786,812 | 1/1974 | Neefe | 351/162 X |
| 3,944,347 | 3/1976 | Barkdoll et al. | 351/160 |

FOREIGN PATENT DOCUMENTS

| | | | |
|---|---|---|---|
| 45857 | 2/1966 | German Democratic Rep. | 351/160 |
| 2309933 | 9/1974 | Fed. Rep. of Germany | 351/160 |
| 1045065 | 10/1966 | United Kingdom | 351/160 |

*Primary Examiner*—John K. Corbin
*Assistant Examiner*—Scott J. Sugarman
*Attorney, Agent, or Firm*—Lackenbach, Lilling & Siegel

[57] ABSTRACT

The combined contact lens is characterized in that it comprises a zone of a hydrophilic material, an aperture in the center of said zone, and a solid body from an optically transparent material fixed in said aperture, said solid body being made in the form of a rod bonded chemically with said zone.

In the method for the manufacture of the combined contact lens, a hydroxyl-containing monomer is polymerized in the presence of an agent initiating polymerization, a solvent, and a linking agent, inside a mould provided with a rod located in the center of the mould and made from a polymer that is inactive toward water but swells in the solution of the starting hydroxyl-containing monomer.

The invention provides good toleration of the lens with the patient and ensures optimum optical effect with various abnormalties of refraction and in various pathological states of the cornea.

5 Claims, 3 Drawing Figures

COMBINED CONTACT LENS

The present invention relates to medicine, and more particularly to a combined contact lens and a method of manufacturing thereof. Said combined contact lens can be used to correct vision in some diseases and pathological conditions of the cornea, for example, keratoconus, astigmatism, cicatrices of the cornea, etc.

Known in the prior art are rigid contact lenses made mostly of polymethylmethacrylate. The method of manufacturing these lenses consists in preparing a polymer blank and subsequent mechanical processing thereof into the required shapes.

Despite the fact that rigid lenses ensure the required optical effect they are badly tolerated by patients due to metabolic disorders in the cornea.

Also known in the prior art are contact lenses made of soft hydrophilic materials, mainly of hydroxyethylmethacrylate polymerization products. In the method of manufacturing these lenses a polymer blank is prepared by polymerization of hydroxyethylmethacrylate in the presence of an initiating agent, for example, benzoyl peroxide, dinitrilazo-bis-isobutyric acid, etc., and also in the presence of a solvent, or without it, and in the presence of a linking agent, e.g. dimethylacrylate ethylene glycol. The polymerization process is effected in a mould, and the blank is then worked mechanically to impart the desired shape thereto.

The disadvantage inherent in soft contact lenses is that in cases with aspheric cornea (astigmatism, cicatrices of the cornea, etc.) the soft contact lens fails to correct the defect of vision since the surface of the lens follows the defective curvature of the cornea.

Known also is a combined contact lens consisting of a zone of a hydrophilic material with a solid body of an optically transparent material fixed in the center of the inner side of the lens (facing the eye). The method for manufacturing this lens is similar to those for manufacturing rigid and soft contact lenses. But the combined lens fails to keep the shape of the optical surface in cases with asperical cornea. Moreover, the presence of two refractive media in the optical zone impairs the image on the retina.

The object of this invention is to provide a combined contact lens that will ensure high optical efficiency and can be well tolerated by the patients.

Said object has been attained in a combined lens consisting of a zone of hydrophilic material and a solid body of an optically transparent material fixed in the center of this zone. According to the invention, an aperture is made in the center of the hydrophilic material, inside which a solid body made in the form of a rod is fixed and chemically bonded with this zone.

It is preferred to use polyoxyalkylmethacrylate as the hydrophilic material and polymethylmethacrylate as the optically transparent material of the solid body in the proposed combined contact lens.

In the method for manufacturing the proposed combined contact lens a hydroxyl-containing material is polymerized in the presence of an initiator of polymerization, a solvent, and a linking agent, in a mould to prepare a polymer blank. According to the invention, the polymerization process is carried out in a mould in the center of which a rod is fixed, made of a material inactive toward water but swelling in the solution of the starting hydroxyl-containing monomer.

It is preferred that polymethylmethacrylate be used as the polymer to give the rod the required optical and mechanical properties.

It is also preferred that water should be used as the solvent and that it should be added in a quantity corresponding to the equilibrium swelling of the resulting polymer.

In order to improve elasticity of the zone of the hydrophilic material, hydroxyethylmethacrylate is recommended to be used.

For a better understanding of the invention it will be further illustrated with an exemplary description of the process for preparing the proposed combined contact lens with reference to the appended drawings in which.

The proposed combined lens consists of a zone of hydrophilic material 2 (FIGS. 1 and 2) and a solid body (FIGS. 1 and 2) made in the form of a rod and chemically bonded to said zone inside an aperture.

Figure 1:
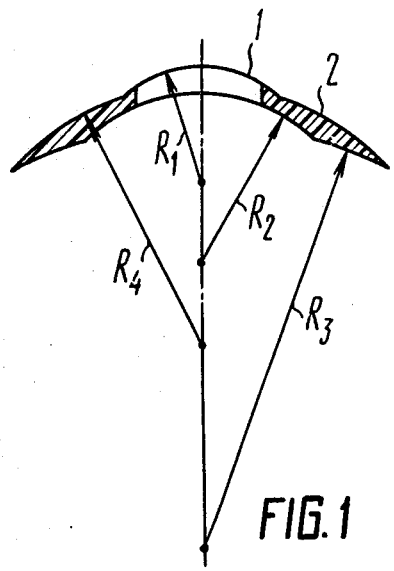
FIG. 1 shows a sectional view of a combined contact lens according to the invention.
Figure 2:
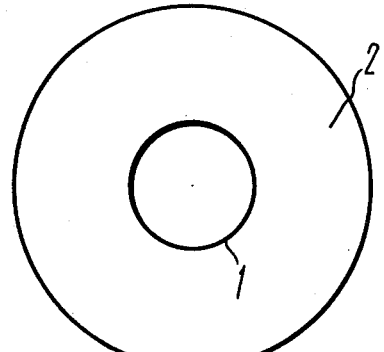
FIG. 2 is a top view of the same lens.

The proposed contact lens is a convexoconcave shell having various radii of curvature of spherical surfaces $R_1$, $R_2$, $R_3$ and $R_4$ (FIG. 1).

The solid body made in the form of a rod is an optically transparent polymer non-swelling in water, preferably polymethylmethacrylate, having good mechanical strength, adequate optical properties, and non-toxic. It is recommendable that the material for the hydrophilic zone should be selected from a series of polymer derivatives of acrylic or methacrylic esters of polyoxy compounds. Preference should be given to polyoxyethylmethacrylate, since it ensures high elasticity and good tolerance of the lens.

The hydrophilic zone can be made either of a material having the same swelling ability, or of a combination of materials having different swelling abilities, so that in order to meet various requirements, the hydrophilic zone can be made in the form of concentric zones.

The swelling ability of the hydrophilic material can increase from the center toward the periphery to facilitate correct fitting of the lens to the eye-ball and to ensure good tolerance.

Figure 3:
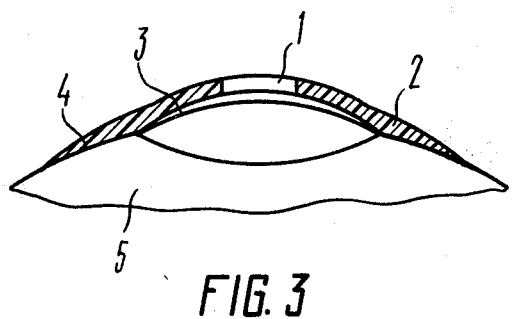
FIG. 3 is a lens according to the invention fixed on the eye of the patient.

The inner surface of the proposed lens should be made so that a certain gap remains between the lens and the cornea 3 of the eye 5 (FIG. 3). The lens can be applied onto the eye so that the hydrophilic material zone should contact the cornea 3 of the eye (FIG. 5), or the sclera 4 (FIG. 3), or both.

The proposed contact lens was tested on six patients with various diseases of the eye (high myopia, irregular astigmatism, traumatic aphakia, keratoconus). The vision of the patients had been corrected with rigid contact lenses. The attempt proved to be effective from the optical aspect, but failed due to bad tolerance. The effect was with the known hydrophilic contact lenses from the point of view of tolerance, but the acuity of vision remained inadequate.

The proposed contact lenses were tried with these patients and the acuity of vision in all cases was at a level attainable only with the known rigid lenses (from 0.7 to 1.0 percent). The tolerance was much improved and the terms of wearing the lenses were increased.

Clinical tests of the combined contact lenses have shown that they can be used effectively to attain optimum optical effect in various abnormalties of refraction and in pathological states of the cornea that otherwise drastically impair the power of vision. The tolerance of the proposed lenses is good.

The method for preparing the proposed combined contact lens consists in the following. A mould is provided with a rod fixed in its center. The rod is made of a polymer that is inactive toward water but swells in a solution of the starting hydroxyl-containing monomer. The hydroxyl-containing monomer for example, hydroxyethylmethacrylate, is polymerized in the presence of a linking agent taken in a quantity of 0.05–5 mole percent of the solvent, and an initiating agent. Ethyleneglycol dimethacrylate, diethyleneglycol dimethacrylate, or some other linking agents can be used.

Any known initiating agents, e.g. acyl peroxides, esters of peracids, etc., as well as ultraviolet and ionizing radiation can be used to initiate the polymerization process.

The rod is made from material, preferably polymethylmethacrylate, that does not swell in water but swells in a solution of the starting hydroxyl-containing monomer, that ensures fast diffuse union of the hydrophilic and non-hydrophilic portions of the blank.

It is preferred to use water as the solvent, although mixtures of water with organic solvents, e.g. ethyleneglycol, can also be used. It is also necessary that the concentration of the monomer correspond to the concentration of the polymer that is formed out of it in the equilibrium swollen state. This ensures absence of tension in the hydrophilic zone and, hence, absence of deformation.

The obtained polymerized blank is worked mechanically by conventional methods into a combined contact lens.

For a better understanding of the invention, the following examples of its practical embodiment are given by way of illustration.

EXAMPLE 1

A tetrafluoroethylene mould, 17 mm in diameter, with a rod, 6.5 mm in diameter, made from plasticizer-free polymethylmethacrylate and fixed in the center of the mould, is filled with 4.8 g of ethylene glycol monomethacrylate containing 0.16 percent of ethyleneglycol dimethacrylate, and 8 mg of dicyclohexyl peroxidicarbonate, and then 3.2 ml of water are added.

Polymerization is conducted for ten hours at a temperature of 45° C., the resulting polymer blank is then extracted from the mould and dried at a temperature of 80° C. A combined contact lens is manufactured from the blank by mechanical processing.

EXAMPLE 2

A tetrafluoroethylene mould similar to that used in Example 1 is filled with a mixture of 6.0 g of ethyleneglycol monomethacrylate and 10 ml of dinitrile of azo-bis-isobutyric acid, 0.25 g of diethyleneglycol dimethacrylate, and 3.0 g of water, and polymerization is conducted for 24 hours at a temperature of 60° C. The resulting blank is then extracted from the mould, dried at a temperature of 80° C., and worked mechanically into a combined contact lens.

We claim:

1. A combined contact lens consisting of a hydrated hydroxyl-containing material having at the center thereof a solid body of optically transparent material, wherein the surface of said solid body does not contact the cornea, said solid body being chemically bonded to said hydrated zone in the swollen state.

2. A combined contact lens according to claim 1, wherein said hydroxyl-containing material comprises polyoxyalkyl-methacrylate.

3. A combined contact lens according to claim 1 wherein said optically transparent material of the solid body comprises polymethylmethacrylate.

4. A combined contact lens consisting of a zone of hydrophilic polyoxyalkylmethacrylate, having at the center thereof and chemically bonded thereto, a solid body of optically transparent polymethylmethacrylate, wherein the surface of said optically transparent polymethylmethacrylate does not contact the cornea, and wherein said hydrophilic polyoxyalkylmethacrylate contacts the cornea and/or sclera.

5. The contact lens of claim 4 wherein said polyoxyalkylmethacrylate is polyoxyethylmethacrylate.

* * * * *